(12) United States Patent
Cohn

(10) Patent No.: US 8,453,563 B2
(45) Date of Patent: Jun. 4, 2013

(54) APPARATUS AND METHOD FOR BARRIER SUBMERSION COOKING

(76) Inventor: Robert Cohn, Dallas, PA (US)

( * ) Notice: Subject to any disclaimer, the term of this patent is extended or adjusted under 35 U.S.C. 154(b) by 0 days.

(21) Appl. No.: 13/345,145

(22) Filed: Jan. 6, 2012

(65) Prior Publication Data

US 2012/0152128 A1 Jun. 21, 2012

Related U.S. Application Data

(62) Division of application No. 12/194,296, filed on Aug. 19, 2008, now abandoned, which is a division of application No. 10/709,273, filed on Apr. 26, 2004, now abandoned.

(51) Int. Cl.
- *A47J 27/10* (2006.01)
- *A47J 37/12* (2006.01)
- *B65D 33/14* (2006.01)
- *B65D 81/34* (2006.01)

(52) U.S. Cl.
USPC ............... 99/426; 99/403; 99/410; 99/414

(58) Field of Classification Search
USPC ....... 99/40, 359, 415, 403; 426/523; 383/100, 383/107, 905
See application file for complete search history.

(56) References Cited

U.S. PATENT DOCUMENTS

| | | | |
|---|---|---|---|
| 1,622,081 A | | 3/1927 | Blincow |
| 2,244,193 A | * | 6/1941 | Guyon et al. ............... 426/523 |
| 3,891,775 A | | 6/1975 | Murray et al. |
| 4,215,629 A | | 8/1980 | Janssen |
| 4,873,919 A | | 10/1989 | Janssen |
| 4,894,247 A | * | 1/1990 | Fong ............................ 426/107 |
| 5,223,286 A | * | 6/1993 | Selbak ........................ 426/94 |
| 5,988,048 A | | 11/1999 | Hunter et al. |
| 7,543,530 B2 | | 6/2009 | Cohn et al. |

FOREIGN PATENT DOCUMENTS

JP 11046698 A 2/1999

* cited by examiner

*Primary Examiner* — Jianying Atkisson
(74) *Attorney, Agent, or Firm* — Caesar, Rivise, Bernstein, Cohen & Pokotilow, Ltd.

(57) ABSTRACT

A method and apparatus for placing an item of food into a cooking vessel capable of quickly achieving an effective frying temperature after placement into the hot cooking oil of a deep fryer is disclosed. The vessel includes a food containment area where food is placed in intimate contact with an interior wall of the vessel. Using a rack, the vessel is submerged into the oil to an effective depth such that the food item containment area remains below the surface of the cooking oil in the deep fryer while a vent of the cooking vessel remains above the cooking oil surface. Heat is substantially instantaneously transferred from the oil through the cooking vessel to the food item contained therein, causing the food to fry. Steam emitted from the food during cooking escapes through the vent.

8 Claims, 11 Drawing Sheets

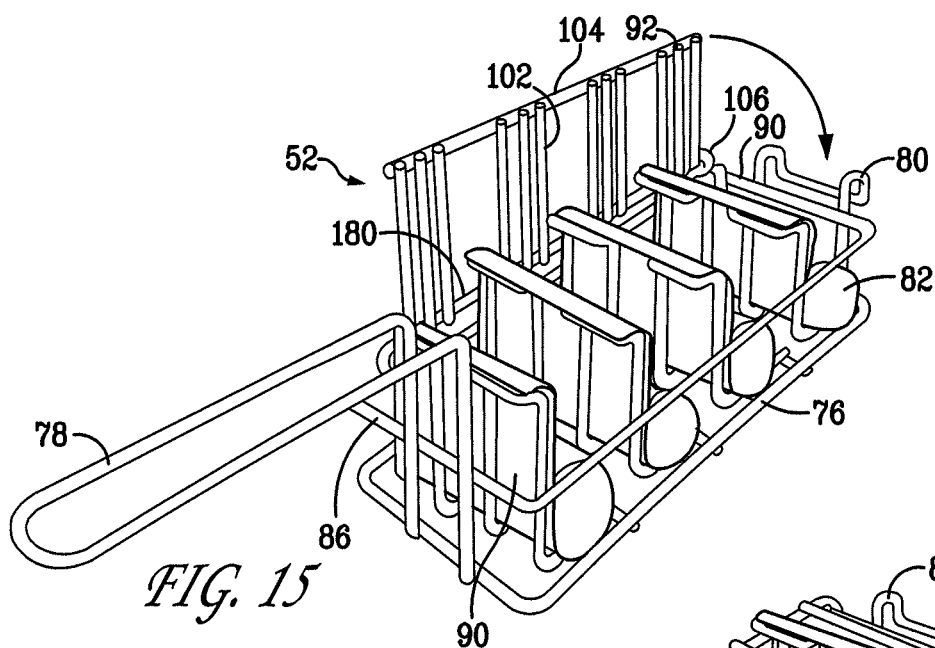
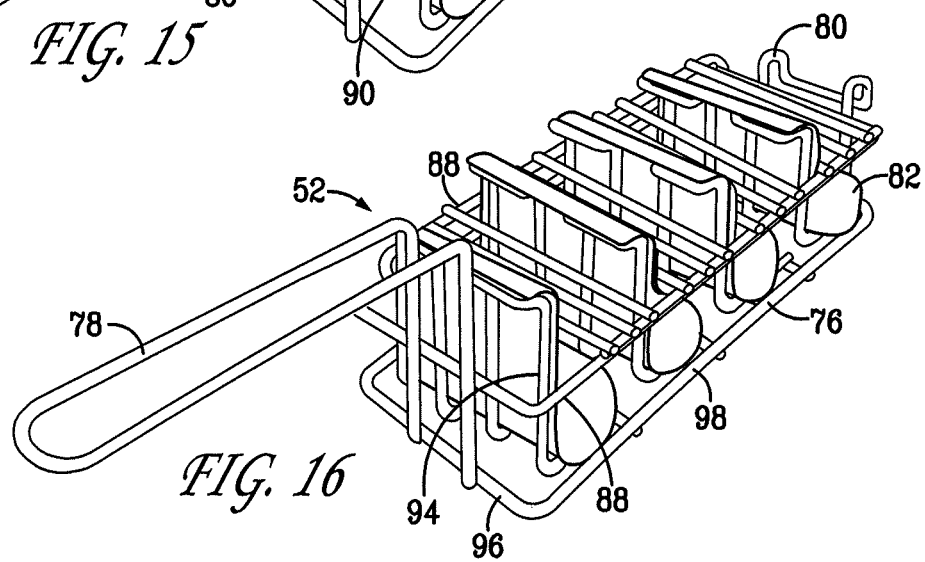
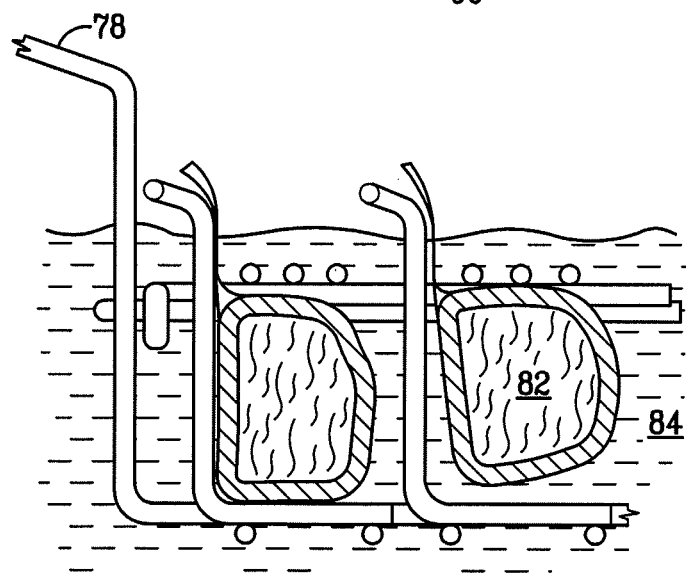

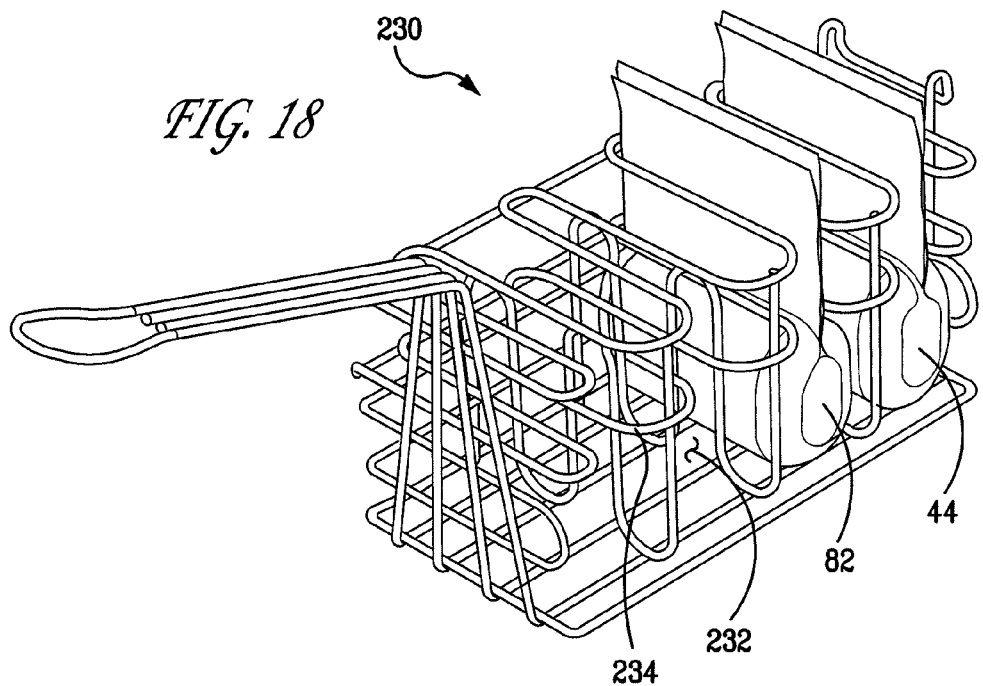
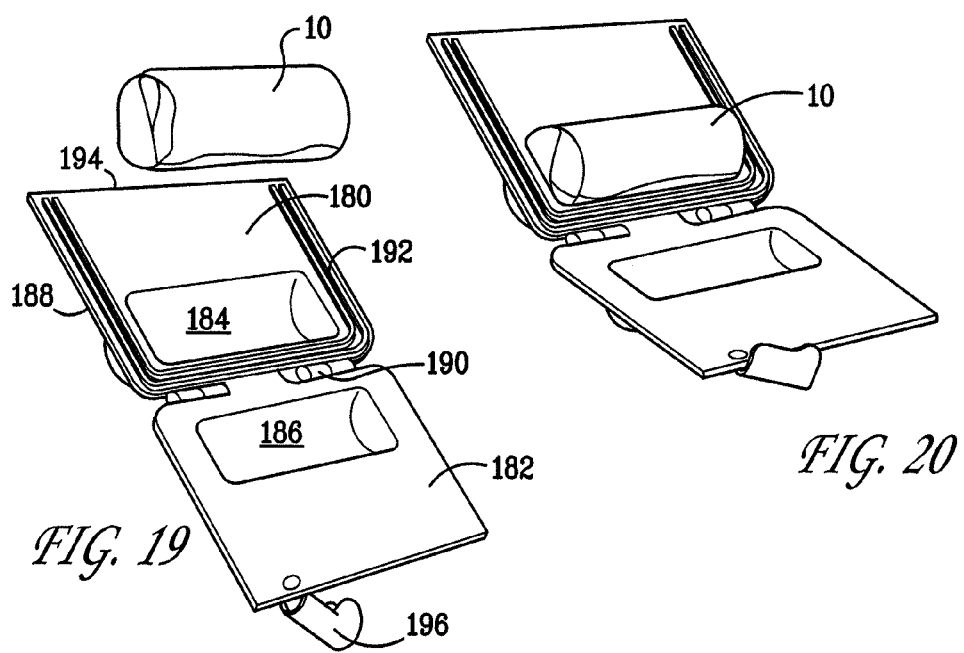

APPARATUS AND METHOD FOR BARRIER SUBMERSION COOKING

CROSS REFERENCE TO RELATED APPLICATIONS

This divisional application claims the benefit under 35 U.S.C. §121 of U.S. patent application Ser. No. 12/194,296, filed Aug. 19, 2008, which in turn claims the benefit under 35 U.S.C. §121 to U.S. patent application Ser. No. 10/709,273, filed Apr. 26, 2004, now abandoned, the contents all of which are incorporated by reference.

FIELD OF THE INVENTION

This invention relates generally to the preparation of food and in particular, to an apparatus and method for barrier submersion cooking.

BACKGROUND OF THE INVENTION

Deep fryers are one of the most useful and popular devices in the commercial kitchen. Deep fryers have been used for years to make french fries, breaded foods, and specialty pastries. Their highly efficient and uniform heat transfer rate results in fast, accurate, and economical cooking.

The modern deep fryer consists of a large well or heating chamber which is filled with cooking oil. The cooking oil is heated to between about 350° to 400° degree f by electric resistance heaters inside the well or gas fired burners located below the heating chamber. Food items to be cooked are placed in wire baskets and lowered into the hot oil to a point of total submersion. Due to the high efficiency of liquid-to-solid heat transfer as well as the high ratio of hot oil volume to cool food volume, heat is rapidly transferred from the hot oil into the cool food product. This rapid and even heat transfer tends to produce a crisp outer surface while heating the foods inner core. The crisp outer food surface acts to seal the food while the moisture on the interior of the food is rapidly increased in temperature effectively steaming the inside of the food. This results in cooked foods such as french fries, fried chicken, or donuts which are crisp on the outside and moist and hot on the inside.

The flavor and unique texture of deep fried foods are key to their popularity. Inherent in this cooking method is a tendency for the food items to absorb a percentage of the oil in which they are being cooked. The amount of oil absorbed into the food can be somewhat reduced by adjusting the oil type and temperature, however, even under the best circumstance, some oil is absorbed into the food. This absorbed oil substantially increases the fat content of the food. High fat content is undesirable in foods. As a result, fried foods are linked to obesity and other health problems.

To eliminate the oil absorption problem, various methods of air frying have been created. Air frying consists of a stream of hot air into which the food product is introduced. The heat transfer efficiency of air-to-solids is lower than the heat transfer efficiency of liquid-to-solids. In an effort to improve heat transfer, a thin coat of oil is typically added to the surface of the food before heating. The oil acts as a heat transfer medium more efficiently coupling the hot air to the cooler food product.

The hot dry air which is used to satisfactorily heat the food causes moisture to evaporate from the food product. Air fried foods typically have a dry outer surface which is less crisp than deep fried foods. Moisture also tends to evaporate from the core of the food as the surface is heated. As a result, due to its poor texture and less desirable taste, air fried foods have not found the level of acceptance typical of deep fried food. New food products have been developed in an effort to overcome the deficiencies of air frying but none has equaled the acceptance of deep fried foods.

In an effort to gain the advantages of liquid-to-solid heat transfer while avoiding the disadvantages of food absorption of the liquid, various submersion barrier cooking techniques have been developed. Submersion barrier cooking requires the food item be held in a container, the container thereafter being submerged into the heated liquid. In theory, the container is fabricated of a material whose heat transfer rate is sufficiently efficient to not appreciably degrade the transfer of heat from the heated liquid to the food. However, in practice, prior attempts at submersion barrier cooking have failed to produce a cooked food product which equals the taste and texture of that produced by traditional deep frying.

Accordingly, there remains a continuing need for improved methods to isolate a food product from the cooking liquid yet continue to maintain the flavor and texture of that produced by traditional deep frying. The present invention fulfills this need, and further provides related advantages.

BRIEF SUMMARY OF THE INVENTION

The present invention relates to a new and different approach to cooking food items using standard deep fryers. Rather than placing the food item into an open wire basket, the present invention places the food item into a thin walled cooking vessel fabricated from a material with an effective heat transfer rate that will cause the temperature of the interior vessel wall to achieve effective frying temperature substantially instantaneously after placement into hot cooking oil.

In a first preferred embodiment, the vessel is effectively dimensioned so that it can be placed into the hot oil of the deep fryer while a vent remains above the top surface of the oil. A food item is inserted into the cooking vessel to fit snuggly into the base of the vessel such that it intimately contacts the interior vessel walls. The vessel top remains open to act as the vent and the vessel side walls are effectively tapered to permit ease of food item removal after cooking.

Using a rack, the vessel is lowered into the deep fryer's hot oil to an effective depth such that the food item is below the surface of the oil while the vent remains above the top level of the hot oil preventing the cooking oil from entering into the vessel and directly contacting the food item. Due to the high heat transfer characteristics inherent in the vessel, heat is substantially instantaneously transferred from the hot oil through the cooking vessel to the food item contained within.

The food item, which is in intimate contact with the cooking vessel on all but its topside, starts frying nearly immediately. Steam and hot vapors omitted from the food during the frying process escape through the vent opening of the cooking vessel.

In a second preferred embodiment, a vessel top cap is added to promote cooking of the top surface of the food item. Heat is transferred from the sidewalls of the cooking vessel into the top cap and onto the top surface of the food item. Openings in the top cap act as vents to allow hot moisture and vapor to escape.

In a third preferred embodiment, the food item is steamed. A small quantity of water is placed into the base of a steaming vessel. The food item is inserted into a vented cooking chamber which is then seated within the steaming vessel. The steaming vessel is lowered into the hot cooking oil whereupon the water is rapidly converted to steam. A cap is effectively positioned over the food item to promote steam circulation in and around the food item with eventual ventilation.

One advantage of the submersion barrier cooking of the present invention is that the cooking vessel does not have to be preheated because it is substantially instantly brought up to cooking temperature when submerged into the hot cooking oil.

A second advantage of the present invention is that a food item will be more evenly heated over its entire surface than that achieved by non-deep fried methods while avoiding absorption of unhealthy cooking oil inherent in traditional deep fried cooking.

Still another advantage is the cost savings achieved in the commercial environment, in that no additional special cooking equipment is required other than a restaurant's existing deep fryer and the vessel and rack of the present invention. The present invention allows a restaurant to extend its cooking capabilities without additional significant equipment purchases.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

FIGS. 15 and 16 are perspective views of a rack containing a pouch.

FIG. 17 is a cross sectional view of a swinging gate rack containing a pouch submersed in cooking oil.

FIG. 18 is a perspective view of an open sided rack containing a pouch.

FIGS. 19 through 21 are perspective views of a second alternative cooking vessel.

DETAILED DESCRIPTION OF THE INVENTION

Figure 1:
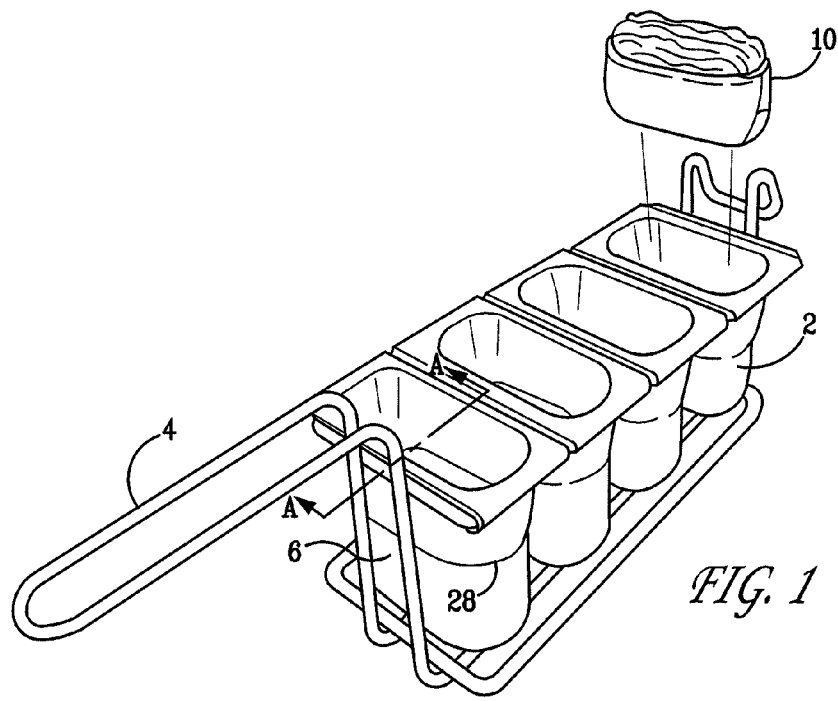
FIG. 1 is a perspective view of a first embodiment vessel seated in its rack.
Figure 2:
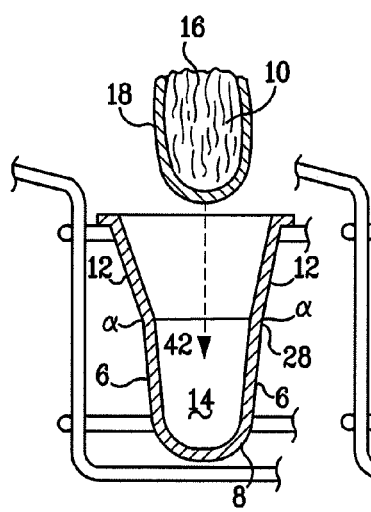
FIGS. 2 through 4 are cross sectional views of a first embodiment vessel seated in its rack.

Turning now to FIGS. 1-4, vessel sidewalls 6 form a vessel 2 having a round or oval horizontal cross section. Alternatively, vessel sidewalls 6 may form vessel 2 having a horizontal cross section of a predetermined geometric shape, for example, rectangular, square, triangular and hexagonal, as required by food item 10 physical characteristics.

Vessel sidewalls 6 form a constriction at a by, for example, utilizing radius 28 to direct vessel superior sidewalls 12 outward. Sidewalls 6 join, preferably seamlessly join, bottom surface 8. In a preferred embodiment, in vertical cross section bottom surface 8 is rounded. However, bottom surface 8 may be any shape that will effectively transfer heat to food item 10 as described below.

Vessel superior sidewalls 12 are preferably tapered outward above radius 28 to permit easier access to and removal of food item 10 held in vessel food item containment area 14. Vessel superior sidewalls 12 extend from vessel food item containment area 14 an effective distance to prevent hot liquid cooking medium, for example, oil 20 from entering food item containment area 14 when vessel 2 is submersed into hot oil 20 as described below. Vessel superior sidewalls 12 terminate in mounting flange 62, used to support vessel 2 within rack 4. Preferably, food item 10 is substantially similar in shape to vessel food item containment area 14, creating increased contact between food item 10 and cooking vessel interior surface 42, thereby effectuating more effective heat transfer.

Food item 10 comprises filler 16 encased by dough 18, for example, pre-cooked meat or vegetable filling encased in a raw or partially cooked dough wrapper. However, food item 10 is not limited to dough encased items. Food item 10 is inserted into vessel 2 so that it fits snuggly into vessel food item containment area 14, preferably in intimate contact with cooking vessel interior surface 42.

Prior to submersion, vessel 2 is supported by rack 4 utilizing mounting flange 62. Rack 4 may hold a single vessel 2 or a plurality of vessels 2, thereby permitting simultaneous cooking of multiple food items. The number of vessels 2 is limited only by rack 4 design.

Rack 4 and vessel 2 are lowered into hot liquid, for example, hot cooking oil 20 contained by a deep fryer (not shown) to a sufficient depth such that food item containment area 14 and, hence, food item 10 are below top surface 24 of hot cooking oil 20 to a depth sufficient to allow effective heat transfer from hot cooking oil 20 through vessel food item containment area 14 to food item 10 to fully cook food item 10. Hot cooking oil 20 substantially instantaneously raises the temperature of vessel food item containment area 14 to an effective frying temperature. Vessel top opening 22 serves as a vent and remains above hot cooking oil top surface 24 an effective distance to prevent hot cooking oil 20 from coming into direct contact with food item 10.

Vessel 10 is formed of a material that substantially instantaneously transfers heat from hot cooking oil 20 to produce effective frying temperature at cooking vessel interior surface 42. Examples of such materials are thin walled aluminum, copper, aluminum alloy, copper alloy, gold, gold alloy, thin walled stainless steel and combinations thereof. Thin walled stainless steel is preferably about 0.030 to about 0.050 inches in thickness. Due to the excellent heat transfer characteristics inherent in such materials, heat is substantially instantaneously transferred from hot cooking oil 20 through cooking vessel 2 to effectively fry food item 10 held within. Food item 10, in substantially intimate contact with food item containment area 14 on all but its top side 26, effectively immediately starts frying. Steam and hot vapors (not shown), which may be omitted from food item 10 during the frying process, escape through vessel top opening 22, which serves as a vent.

Figure 5:
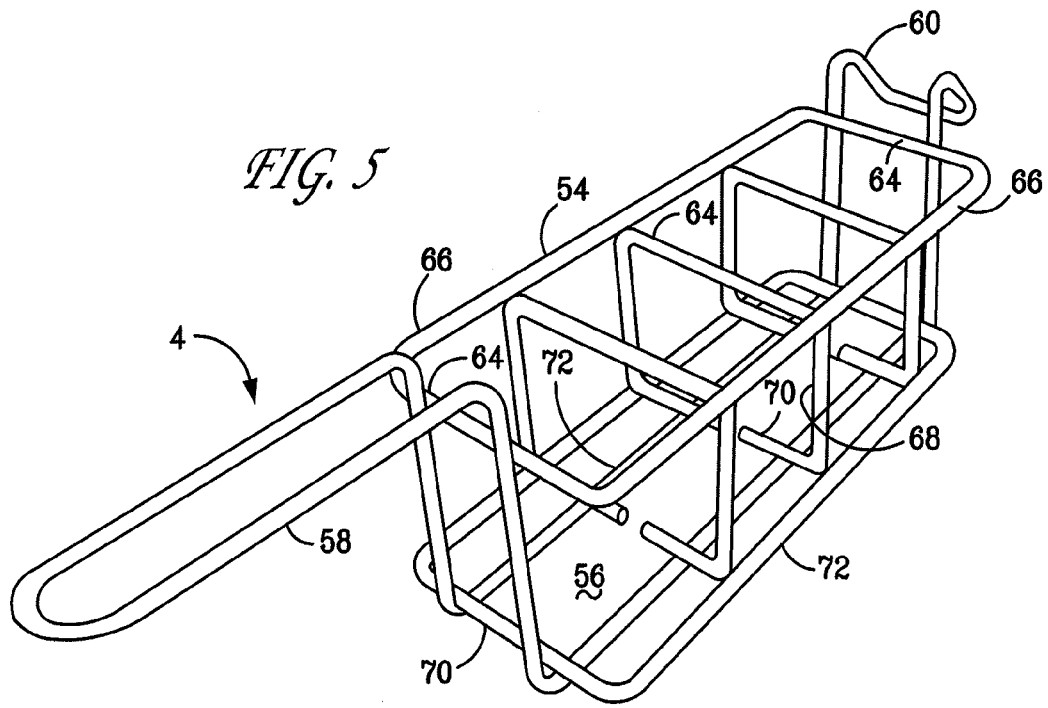
FIG. 5 is a perspective view of a first embodiment rack.

Turning to FIG. 5, rack 4 is fabricated from, for example, wire frame 54. Vessel support section 56 is attached at a first end to handle 58 and at a second end to hanger 60. Hanger 60 rises superior to support section 56 such that when engaged with a deep fryer hanger rail (not shown), vessel food item containment area 14 is submerged in hot cooking oil 20 and handle 58 is not. Hanger 60 is also used to support rack 4 when rack 4 is suspended above hot cooking oil 20 to permit drainage of hot cooking oil 20.

Figure 3:
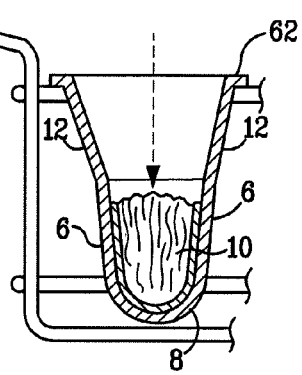
Figure 4:
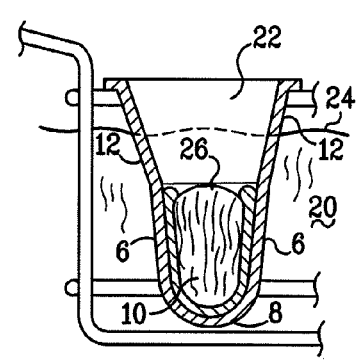

Vessel support section 56 comprises two superior longitudinal members 66 separated by at least two cross members 64. Cross members 64 support handle 58, hanger 60 and mounting flange 62 (FIG. 3). Optionally, to provide additional support for vessel 2, at least one vertical member 68 is attached to cross member 64 and lower cross member 70. At least one lower cross member 70 separates lower longitudinal members 72. Vertical member 68 and lower longitudinal member 72 are dimensioned such that when vessel mounting flange 62 engages longitudinal members 66 and cross members 64, vessel 2 rests upon and is supported by at least one lower longitudinal member 72.

In the embodiment described above, food item top side 26 is difficult to practically cook and is therefore, best utilized, for example, when food item top side 26 is precooked and needs only finishing or does not need to be cooked.

Figure 6:
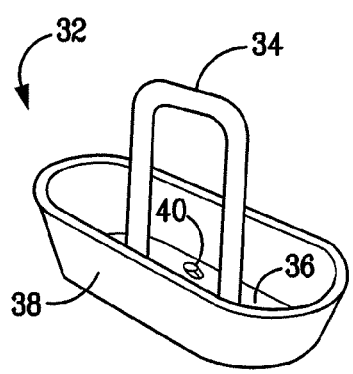
FIG. 6 is a perspective view of a top cap.
Figure 7:
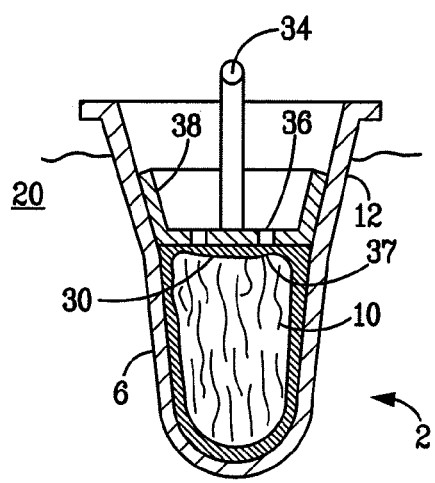
FIG. 7 is a cross sectional view of a top cap seated in a vessel.
Figure 8:
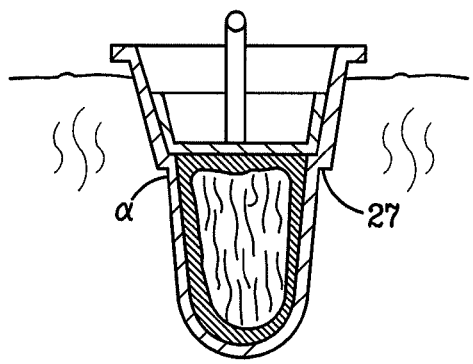
FIG. 8 is a cross sectional view of a top cap seated in a vessel containing a step for positive top cap seating.

Turning to FIGS. 6 and 7, to further promote the cooking of food item top surface 30, in a second preferred embodiment, removable top cap 32 is added to vessel 2. Top cap 32 fits snugly into vessel 2 and simultaneously contacts food item 10 and superior vessel side walls 12. Preferably, when vessel 2 is immersed, hot cooking oil 20 covers at least a portion of superior vessel sidewall 12. Optionally, as shown in FIG. 8, radius 28 (FIG. 2) is replaced by step 27, which serves as a positive stop for top cap 32 and provides a visual demarcation for placement of food item top surface 30.

Top cap 32 is fabricated from a material that will substantially instantaneously transfer the heat from hot cooking oil 20 (through superior vessel sidewalls 12) to create effective frying temperature at top cap floor cooking surface 37. Top cap 32 is typically fabricated from the same material used to form vessel 2.

Top cap 32 comprises handle 34 attached to floor 36. Top cap side walls 38 arise in a generally outward tapered manner from floor 36 such that when top cap 32 is seated, top cap side walls 38 are in intimate contact with superior vessel sidewalls 12. Heat is thereby transferred from hot cooking oil 20 through superior vessel sidewalls 12 into top cap sidewalls 38 and floor 36 and thereafter onto food item top surface 30. One or more optional top cap vents 40 allow hot moisture and vapor to escape.

In use, after food item 10 has cooked for an effective period of time, cooking vessel 2 is removed from hot cooking oil 20. Top cap 32 is removed revealing fully cooked food item 10. Food item 10 can now be removed from cooking vessel 2 using an appropriate tool (not shown) or by turning cooking vessel 2 upside down and tapping it on a solid surface (not shown), thereby causing food item 2 to drop out. The outwardly tapered form of superior vessel sidewalls 12 and sidewalls 6 aids in easy removal of food item 10.

Figure 9:
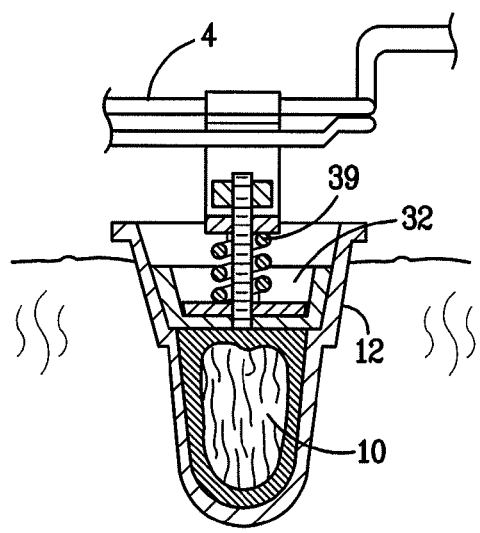
FIG. 9 is a cross sectional view of a spring applying downward pressure to a top cap.
Figure 11:
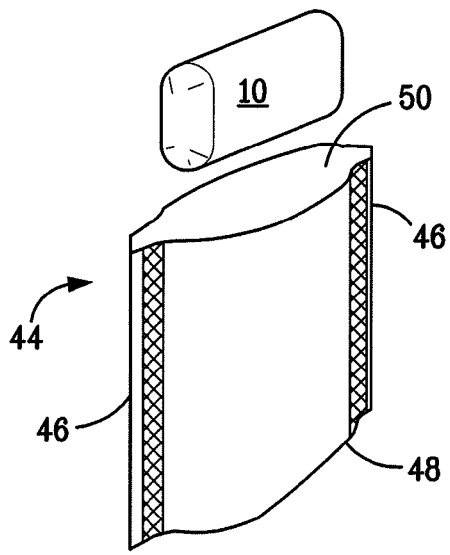
FIGS. 11 through 14 are perspective views of a pouch used as a first alternative cooking vessel.

Optionally, rack 4 may be modified to apply downward pressure, for example, pressure created by spring 39 to top cap 32, to further insure tight, intimate contact between top cap 32 and food item 10 and superior vessel side walls 12, thereby aiding in conduction of maximum heat from superior vessel side walls 12 through top cap 32 to food item 10 (FIG. 9).

To improve cooking efficiency and to promote easy removal of food item 10 after cooking, optionally, cooking vessel interior surface 42 (FIG. 2) and top cap floor cooking surface 37 can be sprayed with a non-stick coating, for example, cooking or vegetable oil, or they may be manufactured with a non-stick coating, for example PTFE (Teflon).

Figure 10:
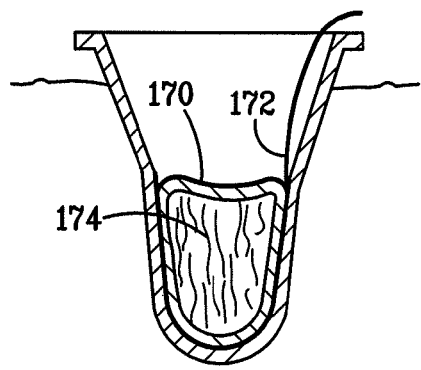
FIG. 10 is a cross sectional view of a flexible sheet material used as an alternative to a top cap.

As shown in FIG. 10, an alternative to top cap 32 is to utilize flexible sheet material 170 having a heat transfer rate of an effective value that will substantially instantaneously transfer the heat from hot oil 20 (through vessel 2) to create effective frying temperature for food item 10. Flexible sheet material 170, for example, a sheet of aluminum foil, is wrapped around food item 10 such that it overlaps itself and forms tail piece 172. Flexible sheet material 170 may be formed into a strip and wrapped around food item 10 leaving the ends of food item 10 unwrapped, or alternatively, food item 10 may be completely encased within flexible sheet material 170. Although encased, because flexible sheet material 170 overlaps are not sealed, cooking vapors are free to escape.

Sheet wrapped food item 174 is placed within food item containment area 14 such that flexible sheet material 170 is in intimate contact with cooking vessel interior surface 42. When cooking is complete, sheet wrapped food item 174 may be easily removed from cooking vessel 2 using tail piece 172.

Figure 12:
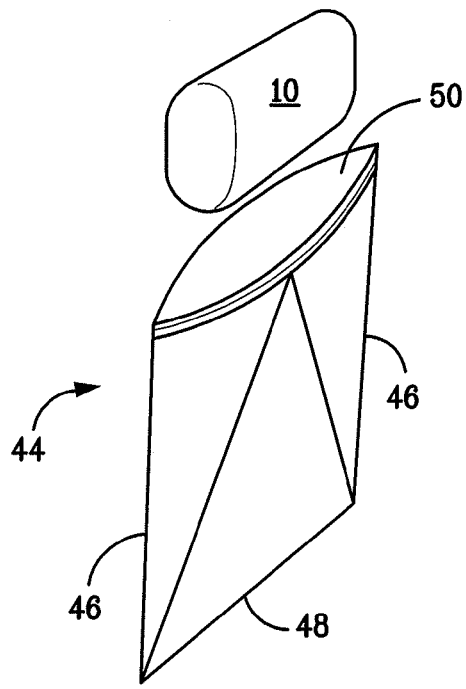

A first alternative cooking vessel 2 is shown in FIGS. 11-14. Pouch 44 is fabricated from a material with a heat transfer rate of an effective value to substantially instantaneously transfer the heat from hot cooking oil 20 to create effective frying temperature at food item 10, for example aluminum foil, copper foil, aluminum alloy foil, copper alloy foil, gold foil, gold alloy foil and combinations thereof. Pouch 44 comprises two sealed sides 46, folded bottom 48 and open top 50. Sealed sides 46 are fabricated, for example, by welding (FIG. 11) or folding (FIG. 12). Optionally, bottom 48 may also be welded rather than folded.

Figure 13:
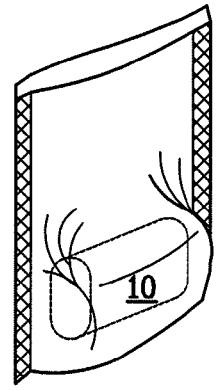
Figure 14:
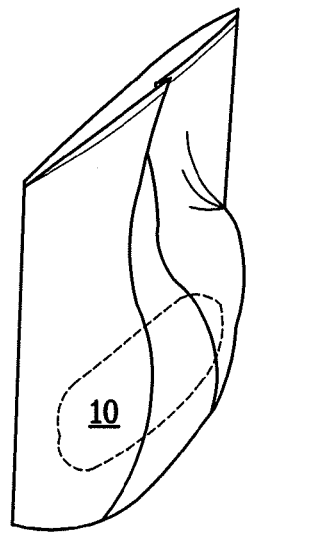
Figure 21:
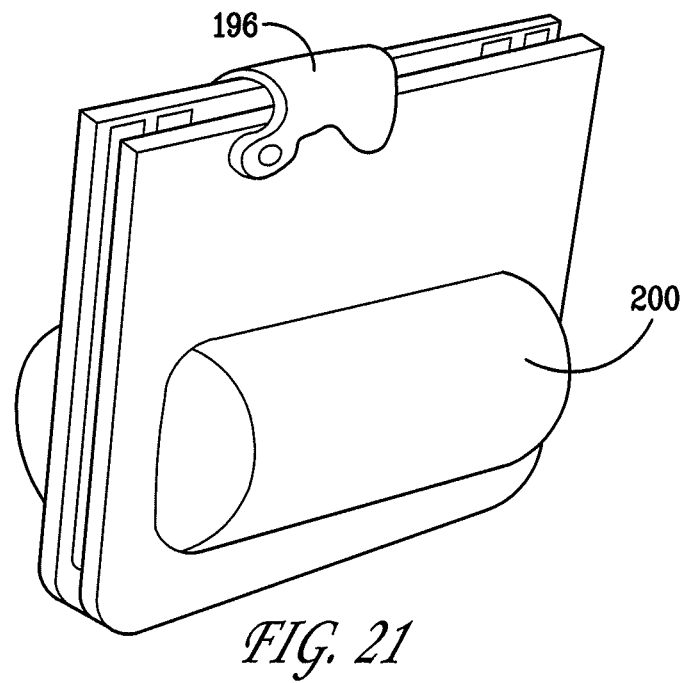

Food item 10 is placed into the bottom of pouch 44. Pouch 44 is compressed around food item 10 so as to come into intimate contact with food item 10 while maintaining a viable pouch open top 50, (FIGS. 13 and 14). Using rack 52, pouch 44 with food item 10 inside is lowered into hot cooking oil to an effective depth that insures food item 10 is completely below the surface level of the hot cooking oil with pouch open top 50 remaining above the surface of the hot cooking oil an effective distance to prevent entry of hot cooking oil into pouch 44.

Shown in FIGS. 15-17, rack 52 is utilized to insure effective positioning of pouch 44 in the hot cooking oil. Rack 52 supports pouch 44 in a substantially vertical position, thereby maintaining pouch open top 50 above the surface of the hot cooking oil. It is essential that the sealed integrity of pouch sealed sides 46 and folded bottom 48 not be breached so that the hot cooking oil cannot enter pouch 44 and come into direct contact with food item 10.

To promote effective cooking of food item top side 26, pouch 44 is pressed together directly above food item 10 such that pouch 44 intimately contacts food item top side 26. Although pressed together, pouch open top 50 must not be fully sealed so that hot steam and other vapors created by rapidly cooking food item 10 can vent while at the same time maintaining intimate contact with food item 10. For example, pouch open top 50 may be sealed using an interrupted seal, or alternatively, a vapor permeable seal, or a pressed (letter) seal.

Such a seal has the additional advantage of maintaining food item 10 integrity during transit.

Rack 52 comprises, for example, wire frame 76. Swinging gate support section 86 is attached at a first end to handle 78 and at a second end to hanger 80. Hanger 80 rises superior to swinging gate support section 76 such that when engaged with a deep fryer hanger rail (not shown), pouch food item containment area 82 is submerged in hot cooking oil 84 and handle 78 is not. Hanger 80 is also used to support rack 52 when rack 52 is suspended above hot cooking oil 20 to permit drainage of hot cooking oil 20.

Swinging gate support section 86 comprises two longitudinal members 88 separated by at least two cross members 90. Cross members 90 support handle 78, hanger 80 and swinging gate 92 when in the closed position. At least one vertical member 94 is attached to cross member 90 and lower cross member 96. At least one lower cross member 96 separates lower longitudinal members 98. Vertical member 94 and lower longitudinal member 98 are dimensioned such that when pouch food item containment area 82 engages lower longitudinal member 98 and pouch open top 50 engages vertical member 94, pouch 44 rests upon and is supported by at least one lower longitudinal member 98 and pouch open top 50 remains above the surface of hot cooking oil 84 an effective distance to prevent hot cooking oil 84 from entering pouch 44.

Swinging gate 92 comprises hinged gate longitudinal member 100 and at least one gate cross member 102 attached thereto. Optionally, gate cross member 102 is attached at its opposite end to a non-hinged gate longitudinal member 104. Gate hinged longitudinal member 100 is hingedly attached to longitudinal member 88 by hinge 106. Gate cross members 102 are effectively spaced such that when swinging gate 92 is in its closed position, gate vertical member 94 extends between gate cross members 102 and gate cross members 102 effectively encase pouch 44 within rack 52, thereby preventing pouch food item containment area 82 from floating above hot cooking oil 84 (FIG. 14).

Alternatively, FIG. 18 displays rack 230 with no moving parts, wherein pouch 44 is slid in from open side 232. Anti-float member 234 is sized and located to overhang pouch foot item containment area 82 to prevent pouch 44 from floating free when submerged in hot cooking oil 84.

A second alternative cooking vessel 178 is shown in FIGS. 19-22. First 180 and second 182 cooking chamber half contain first 184 and second 186 food cavity, respectively. First 184 and second 186 food cavities are dimensioned such that when first 180 and second 182 cooking chamber half are mated, first 184 and second 186 food cavity form food item containment area 200 of a predetermined geometric form that intimately contacts a corresponding predetermined food item geometric form.

Gasket 192, for example, a double rib or single rib gasket, is incorporated into sides 188 and bottom 190 of first cooking chamber half 180. Gasket 192 insures a liquid tight seal between first 180 and second 182 cooking chamber halves to prevent hot cooking oil from contacting food item 10. Cooking chamber top 194 remains unsealed to serve as a vent. Locking clamp 196 holds first 180 and second 182 chamber halves together after insertion of food item 10 and maintains gasket 192 integrity.

One or more cooking vessels 178 are then seated into rack 198, dimensioned to accept cooking vessels 178 and thereafter submersed into hot cooking oil for a predetermined period of time to achieve effective cooking. The design of cooking vessel 178 allows for complete submersion of food item containment area 200 while maintaining a patent vent.

A third alternative cooking vessel 202 is shown in FIGS. 23-26. Vessel 202 comprises first 204 and second 206 cooking chamber half, each having first 208 and second 210 food cavity, respectively. First 208 and second 210 food cavities are dimensioned such that when first 204 and second 206 cooking chamber halves are mated, first 208 and second 210 food cavity form food item containment area 212 having a predetermined geometric form which will intimately contact a corresponding predetermined food item geometric form. Fabricated into first 204 and second 206 cooking chamber halves are channels 216 located such that when first 204 and second 206 cooking chamber halves are mated, vent 218 is created.

A flexible formed gasket 214 is permanently attached to sides 220 and bottom 222 of first 204 and second 206 cooking chamber halves, such that when in the open position, food item 10 may be inserted into food item containment area 212. In the closed position, formed gasket 214 flexes outward allowing first 204 and second 206 cooking chamber halves to mate. Gasket 214 insures a liquid tight seal between first 204 and second 206 cooking chamber halves to prevent hot cooking oil from contacting food item 10. Mated first 204 and second 206 cooking chamber halves are locked in place by lock clamp 224.

One or more cooking vessels 202 are then seated in rack 198 (FIG. 22), dimensioned to accept cooking vessels 202 and thereafter submersed into hot cooking oil for a predetermined period of time to achieve effective cooking. The design of cooking vessel 202 allows for complete submersion of food item containment area 212 while maintaining patent vent 218.

Figure 22:
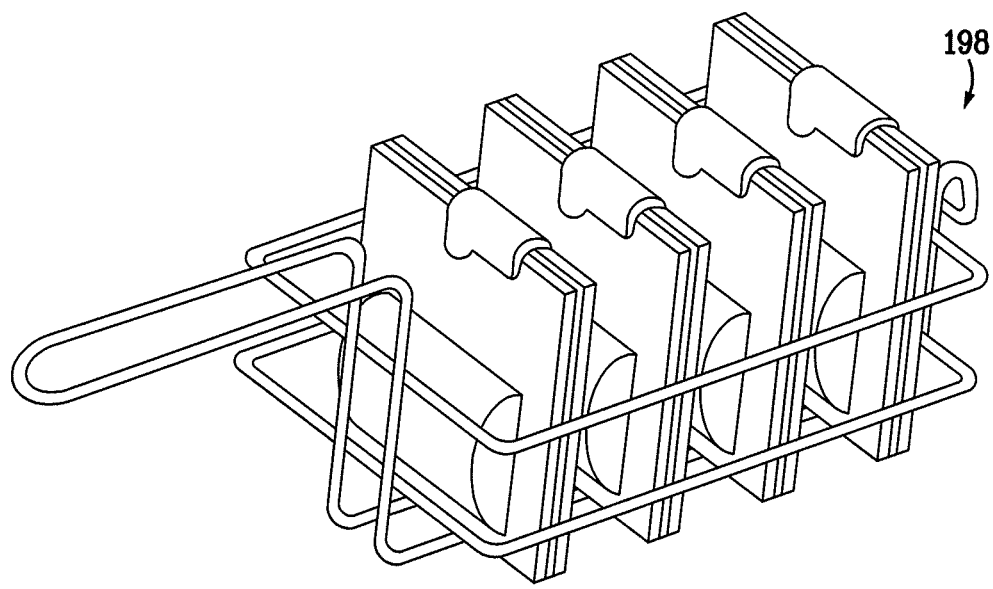
FIG. 22 is a perspective view of a rack containing second alternative cooking vessels.
Figure 23:
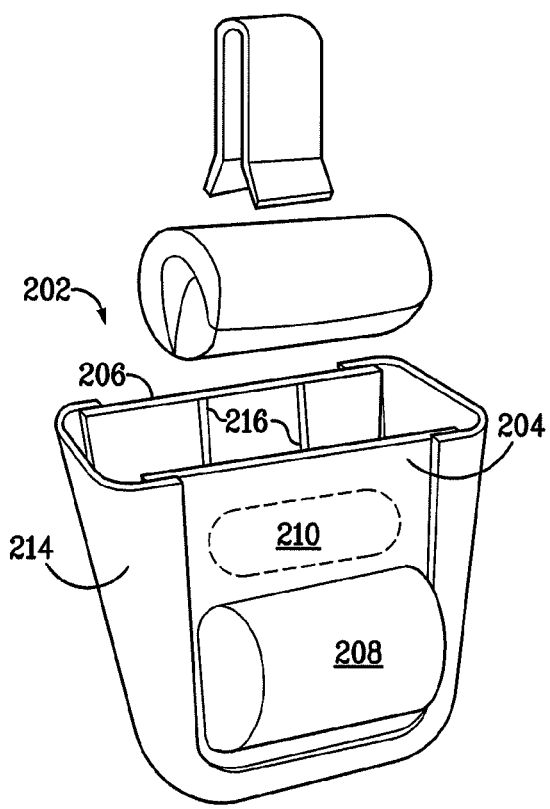
FIGS. 23 through 25 are perspective views of a third alternative cooking vessel.
Figure 24:
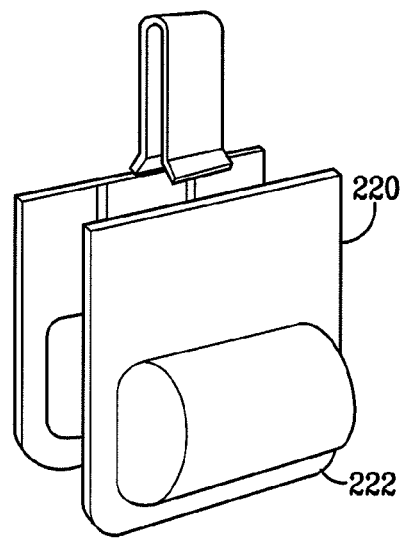
Figure 25:
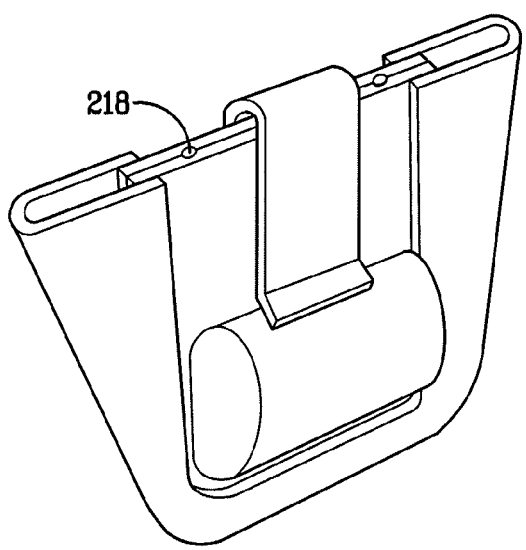
Figure 26:
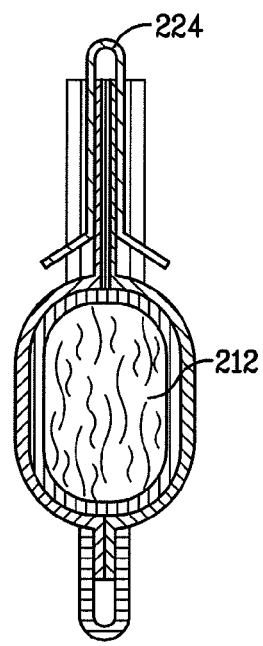
FIG. 26 is a cross sectional view of a third alternative cooking vessel.
Figure 27:
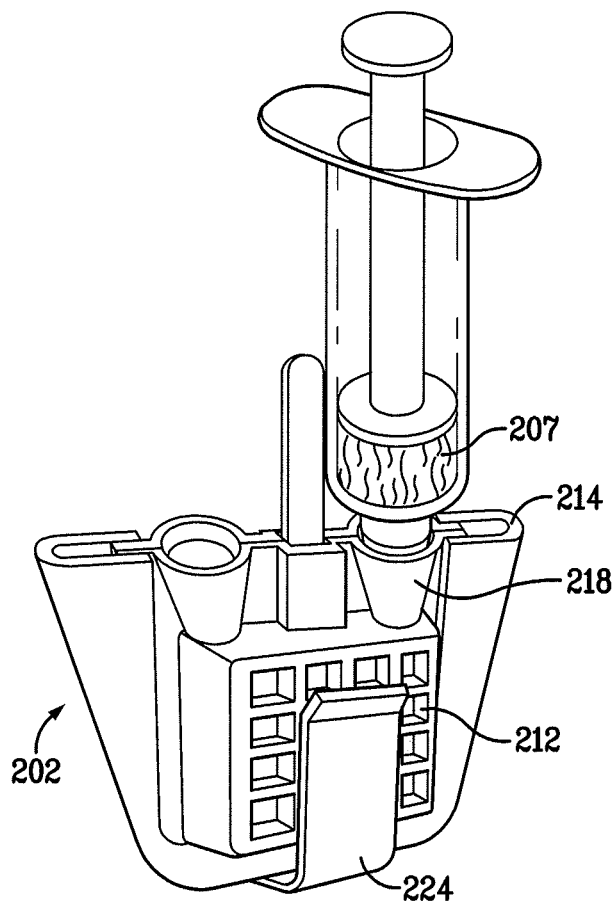
FIGS. 27 and 28 are perspective views of a third alternative cooking vessel for baking waffles on a stick.
Figure 28:
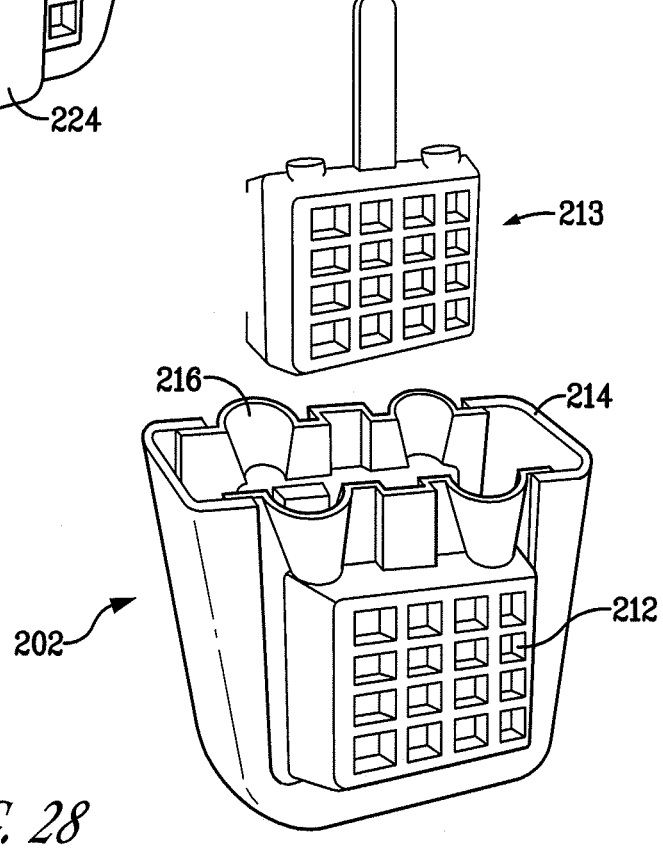

While the exemplars described above utilize pre-prepared solid food items, the present invention is not limited to solid food items. The present invention can also be used to bake batter based foods such as, for example, waffles. FIGS. 27 and 28 display third alternative cooking vessel 202 dimensioned to receive waffle batter 207 through vent 218 to produce waffle on a stick 213. In this vessel, lock clamp 224 may be, for example, free standing or incorporated into rack 198 (FIG. 22). In this manner, the present invention will bake batter based food items as effectively as a conventional waffle iron (not shown).

Figure 29:
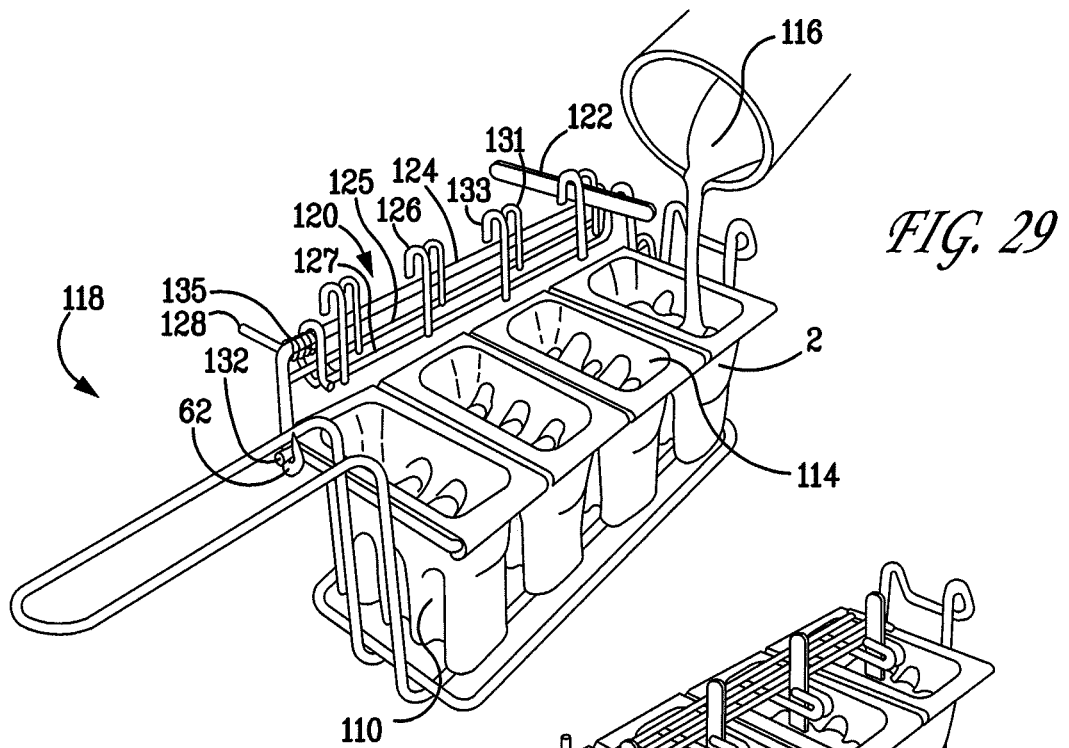
FIGS. 29 through 31 are perspective views of vessels in a rack used to bake waffles on a stick.
Figure 30:
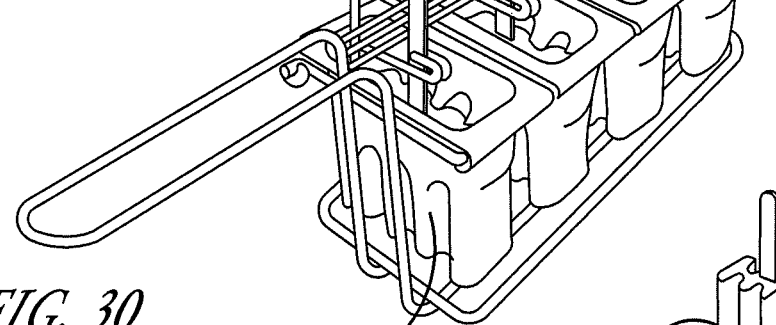
Figure 31:
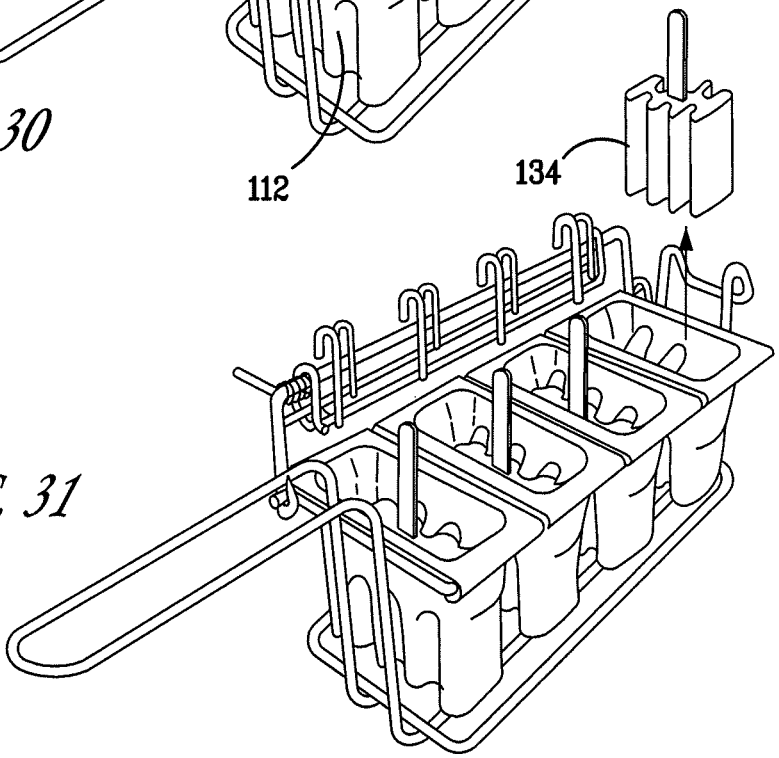

Alternatively, referring to FIGS. 29-31, vessel 2 of the first embodiment is fabricated as described above but with the addition of a plurality of flutes 110, such that vessel 2 comprises a vertical ribbed pattern, preferably a uniform vertical pattern of substantially equal sized ribs 112. Preferably, ribs 112 taper outwards as they move towards the top 114 of vessel 2.

Waffle batter 116 is poured into vessel 2 to a predetermined height. Vessel 2 is lowered into hot cooking oil to an effective depth such that batter 116 is below the surface of the hot cooking oil an effective depth to achieve cooking, while open top 114 of vessel 2 is above the surface of the hot cooking oil an effective height to prevent hot cooking oil from entering vessel 2. An optional top cap (not shown) may be employed to insure thorough cooking of batter 116 top surface. Optional top cap is similar in design to top cap 32 described above, but with the addition of an orifice to permit passage of stick 122. In this manner, the present invention will also bake batter based food items as effectively as a conventional waffle iron (not shown).

The present invention has significant advantages in making waffles over conventional waffle iron methods. Cooking vessel 2 does not need to be preheated because vessel 2 will be substantially instantly brought up to baking temperature when it is submerged into the hot cooking oil. Also, waffle 134 will be more evenly heated over its entire surface than in a conventional electrically heated waffle iron. Additionally, no special cooking equipment is required other than an existing deep fryer (not shown) and rack 118.

Rack 118 comprises the features of rack 4 as described above but with the addition of swinging gate 120 utilized to hold stick 122 in batter 116 prior to cooking. Swinging gate 120 comprises an upper hinged gate longitudinal member 124, a lower hinged gate longitudinal member 125 to which is attached first half 131 of stick retaining member 126, and a sliding longitudinal member 127 to which is attached second half 133 of stick retaining member 126. Spring 135 mounted on upper hinged gate longitudinal member 124 presses stick retaining member second half 133 into stick retaining member first half 131, thereby forming stick retaining member 126.

Gate lifting handle 128 is attached to hinged sliding longitudinal member 127 and is used to both raise and lower swinging gate 120 and to separate first 131 and second 133 half of stick retaining member 126 for insertion of stick 122 between them. In its resting state, spring 135 forces first 131 and second 133 halves together, thereby engaging stick 122.

Upper hinged gate longitudinal member 124 is hingedly attached to longitudinal member 62 by hinge 132. Stick retaining members 126 are effectively spaced and of predetermined length such that when swinging gate 120 is in its closed position, stick retaining member 126 retains stick 122 substantially vertically within batter 116 at a predetermined location. Once waffle 134 has finished baking, stick retaining member 126 is disengaged from stick 122, gate 120 is swung open and stick 122 and waffle 134 are removed as a unit from vessel 2. The resulting "waffle on a stick" is ready for consumption.

Figure 32:
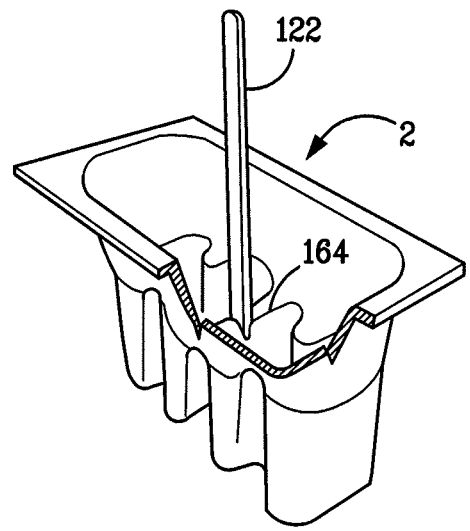
FIG. 32 is a perspective view of a vessel with a stick retaining attachment used to bake waffles on a stick.

Alternatively, shown in FIG. 32, vessel 2 may have a stick retaining attachment member 164, for example, a grip notch or clip, fabricated into vessel 2 bottom. In this manner, stick 122 is inserted into attachment member 164 prior to addition of waffle batter 116. Standard rack 4 may then be utilized, thereby avoiding the expense of a specialty rack.

Figure 33:
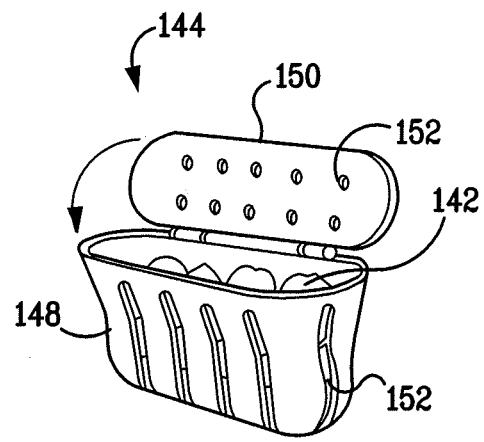
FIG. 33 is a perspective view of a third embodiment cooking chamber.
Figure 34:
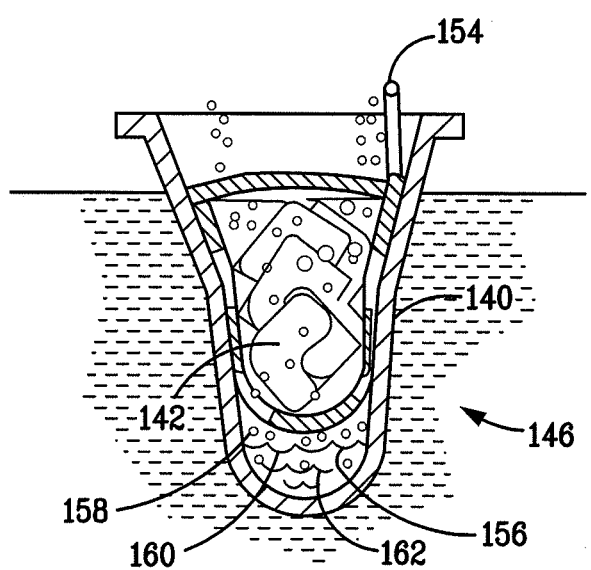
FIG. 34 is a cross sectional view of a cooking chamber contained within a steaming vessel.

In a third embodiment, the present invention is utilized to steam food. Referring to FIGS. 33 and 34, a predetermined quantity of water sufficient to produce an effective amount of steam is placed into water chamber 156 of steaming vessel 140. Steaming vessel 140 may be, for example, vessel 2 of the first embodiment described above.

Food item 142 is placed into cooking chamber 144. Cooking chamber 144 comprises, for example, a generally tub shaped lower section 148 and mating cover 150. Lower section 148 and cover 150 both contain at least one vent 152 to allow steam to enter and exit, respectively. Cover 150 is optionally hingedly attached to lower section 148 and may contain optional handle 154 to allow easy removal of cooking chamber 144 from steaming vessel 140 and to permit convenient opening of cover 150.

Cooking chamber 144 is placed within steaming vessel 140. Cooking chamber 144 is dimensioned such that when fully seated into steaming vessel 140, water chamber 156 is created below fully seated cooking chamber 144. It is essential that air space 158 remain between cooking chamber 144 and water surface 160 to permit formation of steam without immersing food item 142 in water 162.

Cooking chamber 144 is fabricated such that steam is allowed to enter without permitting food item 142 to come into contact with steaming vessel 140. Cooking chamber 144 may be fabricated, for example, from wire mesh, perforated solid or combinations thereof. However, cover 150 must be fabricated from a material, for example perforated solid material, that allows steam to escape at a slow enough rate to maintain sufficient steam within cooking chamber 144 to effectively steam food item 142.

Steaming vessel 140 is lowered into hot cooking oil 146 utilizing, for example, rack 4 as described above, whereupon water 162 is rapidly converted to steam as the steaming vessel is heated by hot cooking oil 146. Preferably, cooking oil 146 is heated to between about 350° to about 400° F. Steaming vessel 140 may be detachable from rack 4 or it may be fixedly attached to rack 4 during rack 4 fabrication.

Preferably, cooking chamber lower section 148 is dimensioned to allow food items 142 to fit loosely, which along with vented mating cover 150 promotes steam circulation in and around food items 142 and eventual ventilation to the atmosphere.

This, third (steam) embodiment of the present invention allows a commercial establishment, for example, a restaurant, to extend its cooking capabilities without a significant additional equipment purchase.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. An apparatus for barrier submersion cooking comprising:
   a. a vessel comprising a first cooking chamber half and a second cooking chamber half, each cooking chamber half having first and second food cavities, respectively, dimensioned such that when the first and second cooking chamber halves are mated, the first and second food cavities form a food item containment area having a predetermined geometric form which will intimately contact a food item having a corresponding predetermined geometric form, said vessel effectively dimensioned such that when placed into a hot liquid cooking medium a vent remains above a top surface of the hot liquid cooking medium, said first and second cooking chamber halves each having left and right sides and a bottom therebetween;
   b. a rack for lowering said vessel into the hot liquid cooking medium to an effective depth such that said food item containment area is below the top surface of the hot liquid cooking medium and said vent is above the top surface of the hot liquid cooking medium; wherein the vessel prevents the hot liquid cooking medium from contacting the food item and is formed of a material that conveys heat from the hot liquid cooking medium to the food item when the vessel is lowered into the hot liquid cooking medium; and,
   c. a gasket permanently attached to the left and right sides and bottom of said first and second cooking chamber halves to produce a liquid tight seal between said first and second cooking chamber halves;
   d. a channel fabricated into each of the first and second cooking chamber halves, said channels positioned such that when the first and second cooking chamber halves are mated, the mated channels form said vent.

2. The apparatus of claim 1, wherein said vent exits at a top surface of the cooking chamber.

3. The apparatus of claim 1, further comprising a locking clamp provided for locking in place said first and second cooking chamber halves when in said mated position.

4. The apparatus of claim 1, wherein said food item is solid food.

5. The apparatus of claim 1, wherein said food item is batter based.

6. The apparatus of claim 5, wherein said food item is waffles.

7. The apparatus of claim 3, wherein said locking clamp is incorporated into the rack.

8. The apparatus of claim 3, wherein said locking clamp is free standing.

* * * * *